(12) United States Patent
Crites

(10) Patent No.: US 6,502,381 B2
(45) Date of Patent: Jan. 7, 2003

(54) PICK-UP RAKE

(76) Inventor: Clark Crites, 2622 Rinconia, Los Angeles, CA (US) 90068-2226

( * ) Notice: Subject to any disclaimer, the term of this patent is extended or adjusted under 35 U.S.C. 154(b) by 0 days.

(21) Appl. No.: 09/825,806

(22) Filed: Apr. 3, 2001

(65) Prior Publication Data

US 2002/0139101 A1 Oct. 3, 2002

(51) Int. Cl.$^7$ .................................................. A01F 7/10
(52) U.S. Cl. ................................. 56/400.12; 56/400.2
(58) Field of Search ........................ 56/400.01, 400.04, 56/400.05, 400.11, 400.12, 400.16, 400.17, 400.18, 400.19, 400.2, DIG. 21

(56) References Cited

U.S. PATENT DOCUMENTS

| | | |
|---|---|---|
| 599,368 A | 2/1898 | Starkwether |
| 603,071 A | 4/1898 | Ake |
| 1,050,685 A | 1/1913 | Peacock |
| 1,424,291 A | 8/1922 | Frank |
| 1,715,613 A | 6/1929 | McFadden |
| 2,504,943 A | 4/1950 | Zifferer |
| 2,746,234 A | 5/1956 | Utley |
| 3,095,682 A | 7/1963 | Pasquine |
| 3,105,348 A | 10/1963 | Vosbikian et al. |
| 3,264,809 A | 8/1966 | Jackson |
| 3,601,966 A | 8/1971 | Kerry |
| 3,733,636 A | 5/1973 | Osadsky |
| 4,018,038 A | 4/1977 | Sipe |
| 4,143,899 A | 3/1979 | Wetherall et al. |
| 4,185,448 A | 1/1980 | Blanco |
| 4,292,794 A | 10/1981 | Gascon |
| 4,378,671 A | 4/1983 | Gascon |
| 4,545,189 A | 10/1985 | Nelson |
| 4,730,864 A | 3/1988 | Sample |
| 4,741,149 A | 5/1988 | vom Braucke et al. |
| D296,510 S | 7/1988 | Cohen |
| 4,930,824 A | 6/1990 | Matthews et al. |
| 5,058,370 A | 10/1991 | Russell |
| 5,303,536 A | 4/1994 | Tolliver |
| 5,513,883 A | 5/1996 | Segla |
| 5,564,266 A | 10/1996 | Laughlin |
| 5,765,351 A | 6/1998 | Frankhouser |
| 6,134,869 A | * 10/2000 | Barrett ..................... 294/50.6 |
| 6,151,878 A | 11/2000 | Kalavitis |
| 6,336,314 B1 | * 1/2002 | Crevier ..................... 294/50.8 |

FOREIGN PATENT DOCUMENTS

| | | |
|---|---|---|
| FR | WO 00/57687 | 10/2000 |
| SE | WO 94/07353 | 4/1994 |
| WO | WO 95/31890 | 11/1995 |

* cited by examiner

*Primary Examiner*—Robert E. Pezzuto
*Assistant Examiner*—Meredith C. Petravick
(74) *Attorney, Agent, or Firm*—Eric Karich

(57) ABSTRACT

A pick-up rake has an elongate handle attached to a rake head. The rake head is pivotally attached to a grasping element through a connector element having first and second rake hinges. The connector element enables the grasping element to be pivoted from a stored positioned to a closed position, the connector element pivoting to enable the rake head to remain in contact with a ground surface while the grasping element moves from the stored to the closed positions, despite the pick-up rake being held at a natural 45 degree angle to the ground surface. A slider element and a slider rod cooperate to enable a user to clamp the grasping element against the rake head, thereby grasping debris therebetween and facilitating removal of the debris.

3 Claims, 6 Drawing Sheets

PICK-UP RAKE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to rakes, and more particularly to a pick-up rake that enables a user to grab leaves and other debris with the rake, thereby facilitating their disposal.

2. Description of Related Art

The following art defines the present state of this field:

vom Braucke et al., U.S. Pat. No. 4,741,149, teaches a garden-clearing tool that includes a rake and a pivotally mounted grasping element that can be used to clamp debris under the motivation of a slider assembly similar to the present invention (see FIG. 3). However, this tool does not teach the use of a connector element having first and second rake hinge elements that enable the proper folding of the grasping element. This tool will not function unless the tool is held perpendicular to the ground, otherwise the grasping element cannot be closed. Only the "double hinge" structure of the present invention allows this flexibility.

Kerry, U.S. Pat. No. 3,601,966, teaches a combination rake and pickup device consisting of a pair of oppositely disposed conventional broom rake heads, one of which has attached thereto an elongated handle. The other rake head is movably supported by the elongated handle, and may be selectively shifted to either an inoperative retracted position, or an advanced position where it enters into a holding relationship with the first mentioned rake head.

Gascon, U.S. Pat. No. 4,378,671, teaches a pick-up rake having a main rake head and an auxiliary rake head movably mounted with respect to the main rake head, enabling the auxiliary rake head to be moved from a storage position adjacent to the main rake head to a position where the two rake heads cooperatively act to grasp leaves and grass therebetween. When the auxiliary rake head is in storage position, the rake may simply be used in a conventional manner for the raking of leaves and grass; while in pick-up configuration, the rake enables grass and leaves to be picked up avoiding the necessity of one having to stoop or kneel to gather leaves or grass for disposal.

Gascon, U.S. Pat. No. 4,292,794, teaches a pick-up rake having a main rake head and an auxiliary rake head movably mounted with respect to the main rake head enabling the auxiliary rake head to be moved to an upper laterally-compacted position enabling the rake to be used in conventional fashion and movable to a lowered laterally-expanded position where the two rake heads cooperatively act to grasp leaves and grass and the like.

While Kerry and Gascon suggest a double-hinge similar to the present invention, they do not teach a slider element, a slider rod, and first and second slider hinge elements that enable the slider element to operably control the movement of the grasping element without interfering with the folding of the connector element.

Kalavitis, U.S. Pat. No. 6,151,878, teaches a rake having a supplemental rake pivotally attached for picking up leaves. In one embodiment (FIGS. 8–9), the supplemental rake is pivotally attached with a double hinge. Significantly, however, the extension arm is pivotally attached to the double hinge, not to the supplemental rake (grasping element). While this design is close to the present invention, the critical change in the attachment of the slider rod leads to a significant change in the folding of the mechanism and function of the rake.

Sample, U.S. Pat. No. 4,730,864, teaches a trash and leaf gathering and pick up tool having two rake like gathering heads pivotally interconnected to close and open toward and away from each other in a jaw like action. One of the rake like gathering heads has a handle adapted to fit a user's arm and is equipped with an arm band for mounting of the tool on an arm. The other rake like gathering head has a handle extending through the pivot interconnect with the handle mountable on an arm to a hand grip equipped end positioned for being grasped by the hand of the arm mounting the tool whereby the tool is manually manipulated in its closing leaf and trash grasping action and jaw opening manipulation to dump trash.

Nelson, U.S. Pat. No. 4,545,189, teaches an attachment to a conventional rake having a grasping head pivotally attached to a link which is pivotally attached to the rake head such that an operable clamp is formed, the grasping head being operated by a lever attached to the rake's handle. The pivotal link separates the upper portions of the two heads such that the capacity of the "grasp" is greater than that of conventional rakes with grasping apparatus.

Blanco, U.S. Pat. No. 4,185,448, teaches a rake of the type having a fanned spring finger main raking head fixed at one end of a rake handle provided with an auxiliary, complementary fanned spring finger rake head pivotally supported with respect to the rake handle and movable into clamping jaw-like relation with respect to the main raking head for picking up raked trash piles. The individual spring fingers of one rake head are receivable between the spring fingers of the other rake head to provide for raking with either rake head when they are held in relatively clamped together position.

Wetherall et al., U.S. Pat. No. 4,143,899, teaches an implement for gathering objects lying on the ground having an elongate handle. A transverse member is mounted at a forward end of the handle. This member has a rearward surface extending at an oblique angle to the axis of the handle. A movable member is pivotally mounted at or adjacent the forward-end of the handle for movement between an inactive position and an active position. In the active position it cooperates with the rearward surface of the transverse member for picking up objects from the ground. The movable member is biased towards its inactive position by spring means.

Sipe, U.S. Pat. No. 4,018,038, teaches a hand rake with grasping tines disclosed including a pair of multitined fork members, a frame assembly for pivotally holding the fork members in spaced facing relation, a handle assembly secured to the frame assembly for carrying the fork members, and a control mechanism for cooperatively varying the pivotal dispositions of the fork members from an open material raking condition to a closed material transporting condition.

Osadsky, U.S. Pat. No. 3,733,636, teaches a combination implement including a broom, a shovel mounted on one side of said broom adapted to be shifted from a raised, inoperative position to a lowered, operative position projecting below the broom head, and a scraper mounted on the opposite side of said broom adapted to be shifted from a raised position to a lowered position projecting below said broom, said shovel and scraper forming rigid elements when in their raised, inoperative positions preventing the broom bristles from bending too far and breaking during use, thereby promoting the useful life of said broom.

A. L. Jackson, U.S. Pat. No. 3,264,809, teaches the movement of objects of various kinds together in order that they may be collected and removed in a group and also relates to apparatus and equipment by which such collection and removal can be accomplished.

P. S. Vosbikian et al., U.S. Pat. No. 3,105,348, teaches a novel construction and arrangement of a garden rake and more particularly a novel means to clamp the material, which has been raked up against the teeth of the rake.

T. A. Pasquine, U.S. Pat. No. 3,095,682, teaches a leaf rake and the like and more particularly a rake incorporating a second rake assembly so arranged to be used in connection with the principal rake assembly in carrying material such as leaves and grass.

A. B. Utley, U.S. Pat. No. 2,746,234, teaches a garden rake and has special reference to a garden rake provided with a trash gripping device.

M. F. Zifferer, U.S. Pat. No. 2,504,943, teaches a rake of the broom type in which is incorporated means whereby it may serve to pick up a quantity of leaves or rakings facilitate transportation thereof from one place to another. For this purpose the rake is provided with a fixed head forming a mounting for one set of aligned tines, and with a second head, swingingly mounted with respect to the first, forming a mounting for a second set of aligned tines which are adapted to interfit with those of the first set whereby all the tines of both sets may occupy operative positions in alignment.

E. P. McFadden, U.S. Pat. No. 1,715,613, teaches garden rakes, the primary object of the invention being to provide a rake of this character equipped with a device for gathering and holding trash, grass and the like and carrying it to any desired dumping place where it may be released.

D. W. Frank, U.S. Pat. No. 1,424,291, teaches a new and useful implement from the combination of various other implements into a unified structure, so that the user may more conveniently and efficiently avail himself of the separate or joint use of any of the implements so combined.

J. Peacock, U.S. Pat. No. 1,050,685, teaches a combined garden tool wherein will be embodied a rake, a sod trimmer and a hoe which are so arranged relatively to the handle that either one may be conveniently exposed for use.

R. D. Ake, U.S. Pat. No. 603,071, teaches a combined brush and dust scoop or shovel especially designed for use for street-cleaning purposes and to save time in its use and expense in its manufacture as compared with the use of separate implements heretofore employed for the purpose.

E. Starkwether, U.S. Pat. No. 599,368, teaches a lawn-rake, a scraper, a hoe, a weed-cutter, and a window cleaner combined.

Frankhouser, U.S. Pat. No. 5,765,351, teaches a garden rake pick-up attachment for a garden rake of the type having a bow rake head tine section and a handle comprises a pick-up tine section, a clamp section, and a handle section: the pick-up tine section comprising a tine bar carried by yoke bars, the yoke bars having a yoke section therein including a hinge member extending between the yoke bars. the clamp section comprises top and bottom clamps shaped to engage the garden rake yoke bars and to confine the hinge member relative to the garden rake tine section. The pick-up yoke section is shaped to enable the garden rake handle to pass therethrough. The pick-up handle section comprises an elongated handle rod pivotably connected to the pick-up yoke section, a handle grip at an opposite end of the handle rod, and a stop for holding the pick-up tine section in an open position. The pick-up handle section is configured to provide a limit stop to prevent the pick-up tine section from being closed beyond a predetermined limit when installed on the garden rake.

Laughlin, U.S. Pat. No. 5,564,266, teaches grass rake tongs consisting of a pair of rakes each having an array of tines joined to a handle by a ferrule and means such as a pin or bolt disposed through the handles above the ferrules at a point approximately mid-way between the lower end of the tines and the upper end of the handles pivotally connection the handles for rotation with inside portions of said arrays of tines opposing each other. Preferably, rotation about the pivot extends approximately 180° from a fully opened condition in which the handle of each rake abuts an outer portion of the array of tines of the other rake to a fully closed condition in which an inner surface of each array of tines abuts an inner surface of the other array of tines.

Tolliver, U.S. Pat. No. 5,303,536, teaches a lawn rake with debris pickup capability. The lawn rake is particularly useful as an implement for raking leaves, debris from a grassy lawn into piles, then to encircle/grasp the debris pile for lifting, transport and dumping. In using the Lawn rake, the operator does not have to bend over to pick up leaf/debris piles.

Segla, U.S. Pat. No. 5,513,883, teaches an implement for receiving and containing ashes during cleaning of a stove or fireplace. The inventive device includes a collection box for scooping and receiving ashes. A closure is pivotally mounted to the box for containing the ashes therewithin. A handle assembly extends from the box for facilitating manual manipulation of the box and operation of the closure.

Matthews et al., U.S. Pat. No. 4,930,824, teaches a gutter cleaner for remotely cleaning an overhead gutter of the like which includes an elongate handle, a pair of cooperating fork-like jaws mounted at the upper end of the handle, and a sleeve slidably mounted on the lower end of the handle for selectively opening and closing the fork-like jaws. The jaws include a stationary first jaw and a pivotably movable second jaw which each have a greater width than height so that the jaws may be placed in a gutter extending in a direction lengthwise with the gutter. In this manner a substantial length of the gutter may be cleaned of collected debris with each application of the gutter cleaner thereto.

Russell, U.S. Pat. No. 5,058,370, teaches a pick-up head hingedly attached to the rear side of a lawn rake making lawn work easier and more convenient. The arm attached to the pick-up head is pushed into a clamp on the rear side of the rake handle. This clamp holds the pick-up head assembly secure in an upright, storage position while allowing normal raking. When pick-up is desire, the arm is pulled forward releasing it from the clamp and manually pushes the pick-up head into position adjacent the main rake head thus compressing debris between the two heads. The debris may be released by returning the assembly back into the original upright position.

Cohen, U.S. Pat. No. Des. 296,510, teaches an ornamental design for a combined rake and collector.

Billstam et al., WO 94/07353, teaches a rake assembly comprising a handle and a rake-unit which coacts with one end-part of the handle, wherein the rake-unit comprises a single rake-part or two rake-parts, and wherein the rake-part or rake-parts is/are attached to the end-part of the handle by means of a respective pivot shaft such as to enable the rake-unit part or rake-unit parts to be moved to a position transversely to the handle and a position parallel with said handle. The rake assembly is characterized in that the single rake-unit part or the two rake-unit parts is/are pivotally mounted to the end-part of the handle in a manner to provide an opening into which an additional tool, such as a ball retriever, can be firmly but removably fitted.

Bietrix, WO 00/57687, teaches a novel gardening tool similar to a rake or broom for the garden comprising fixed teeth and moveable teeth, characterized in that it comprises a handle that slides on a stick which pushes a rod that is fixed on a transverse member that actuates said movable teeth between a closed position and an open position and in that the fixed teeth and the moveable teeth are disposed on the same plane when in a closed position.

Darnell, WO 95/31890, teaches a foldable rake implement including an elongated handle having a proximal end to be grasped by the user and a distal end. An articulated frame structure is attached to the handle at the distal end. The articulated frame structure includes a central axis or articulation dividing the frame structure into two mirror-image first and second frame halves. The axis of articulation is coaxial with the handle and defines an axis about which the articulated frame structure moves between an unfolded position whereat the first and second frame halves of the frame structure symmetrically project outwardly to opposite lateral sides of the handle and a folded position whereat the first and second frame halves are moved toward each other and into generally mutual overlaying relationship. The articulated frame structure further includes a plurality of spaced-apart tines, a plurality of first transverse fingers projecting outwardly from one side of the first frame half, and a plurality of second transverse fingers projecting outwardly from one side of the second frame half opposite the first fingers.

The prior art teaches rakes that can be used to pick up debris. However, the prior art does not teach a pick-up rake that includes a rake head that is pivotally attached to a grasping element through a connector element having first and second rake hinges, the connector element enabling the grasping element to be pivoted from a stored positioned, through an open position, to a closed position, without raising the rake head out of contact with a ground surface despite the pick-up rake being held at a natural raking angle that is approximately 45 degrees to the ground surface. The prior art also does not teach a slider element, a slider rod, and first and second slider hinges that enable the slider element to operably control the movement of the grasping element without interfering with the folding of the connector element. The present invention fulfills these needs and provides further related advantages as described in the following summary.

SUMMARY OF THE INVENTION

The present invention teaches certain benefits in construction and use which give rise to the objectives described below.

The present invention provides a pick-up rake having an elongate handle attached to a rake head. The rake head is pivotally attached to a grasping element through a connector element having first and second rake hinges. The connector element enables the grasping element to be pivoted from a stored positioned, through an open position, to a closed position, the connector element pivoting to enable the rake head to remain in contact with a ground surface while the grasping element moves from the stored to the closed positions, despite the pick-up rake being held at a natural raking angle, approximately 45 degrees to the ground surface. A slider element and a slider rod cooperate to enable a user to clamp the grasping element against the rake head, thereby grasping debris therebetween and facilitating removal of the debris.

A primary objective of the present invention is to provide a pick-up rake having advantages not taught by the prior art.

Another objective is to provide a pick-up rake having a rake head and a grasping element that together can be used to grasp debris, the rake head and the grasping elements being pivotally connected with a connector element having first and second hinges that enable the rake head to remain in contact with a ground surface while the grasping element moves from the stored, through an open position, to the closed positions, despite the pick-up rake being held at a natural raking angle that is approximately 45 degrees to the ground surface.

A further objective is to provide a slider element connected to the grasping element through a slider rod and first and second slider hinges, the first and second slider hinges enabling the slider element to control the movement of the grasping element without interfering with the folding of the connector element.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
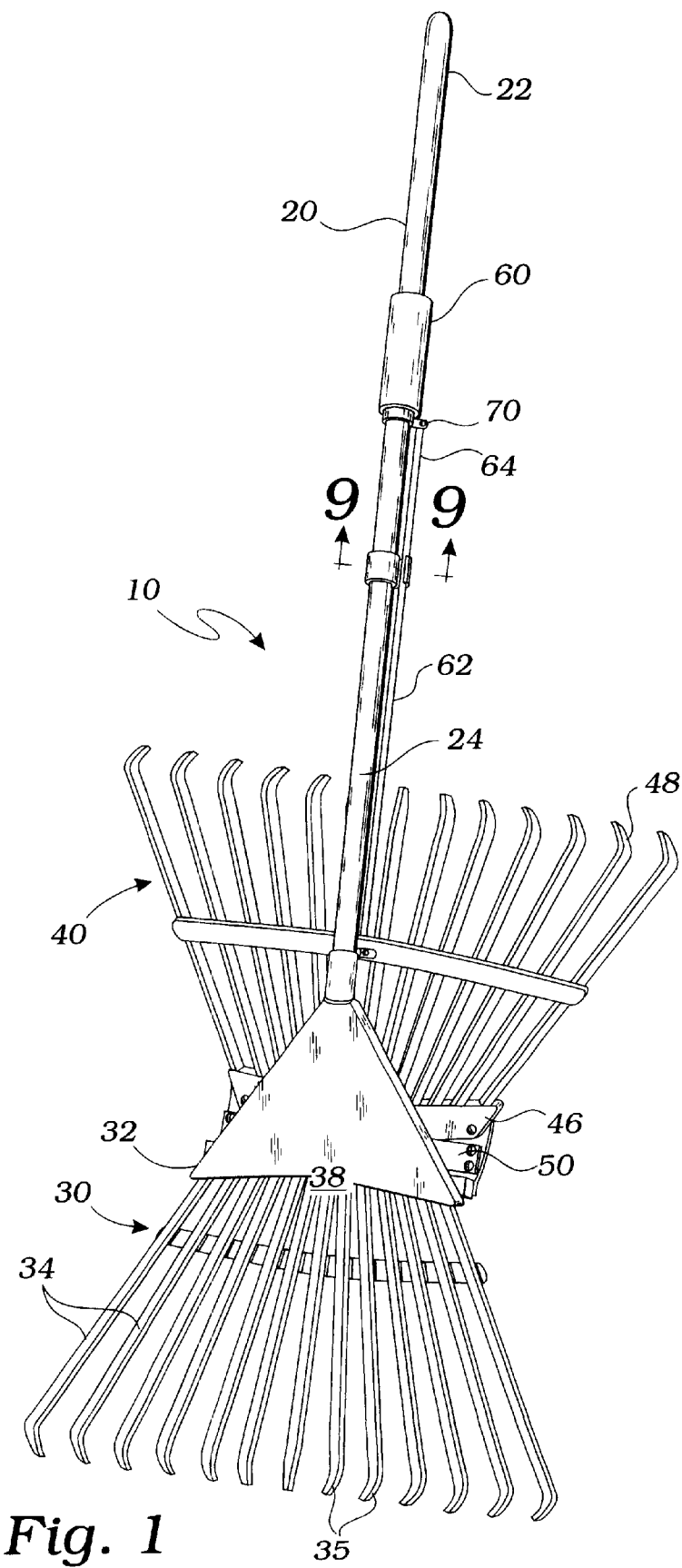
FIG. 1 is a front perspective view of a first embodiment of the present invention illustrating a grasping element in a stored position.
Figure 2:
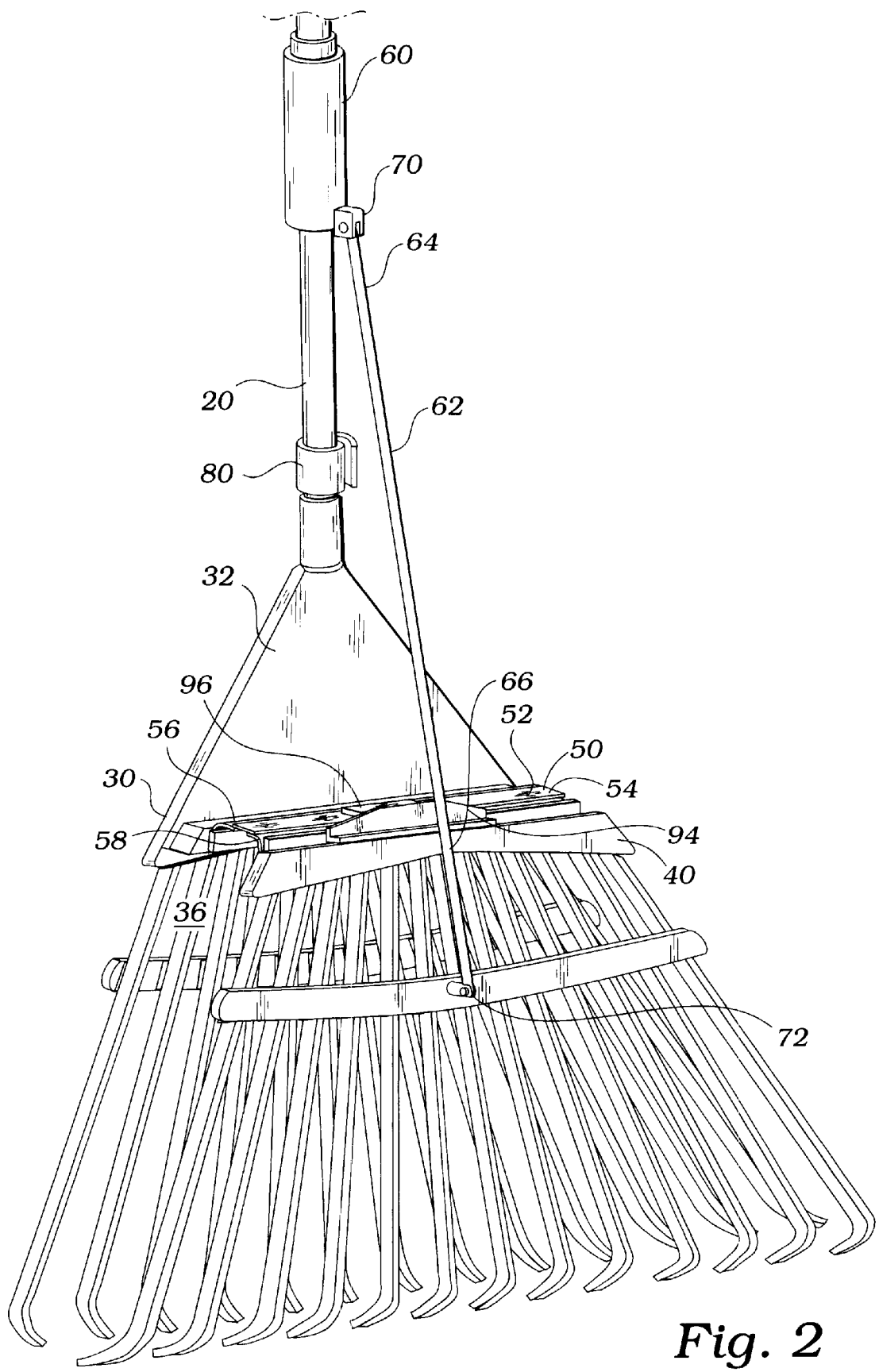
FIG. 2 is a rear perspective view thereof illustrating the grasping element in a closed position.

The above described drawing figures illustrate the invention, a pick-up rake 10 useful for gathering debris 12 and also grasping and lifting the debris 12 for disposal. As shown in FIG. 1, the pick-up rake 10 has an elongate handle 20 attached to a rake head 30, as is well known in the prior art. As shown in FIG. 2, the rake head 30 is pivotally attached to a grasping element 40 through a connector element 50 having first and second rake hinges 56 and 58. The connector element 50 enables the grasping element 40 to be pivoted from a stored positioned, shown in FIGS. 1 and 3, through an open position shown in FIG. 4, to a closed position shown in FIGS. 2 and 6. Critical to the invention, the connector element 50 shown in FIGS. 2–6 pivots to enable the rake head 30 to remain in contact with a ground surface 14 while the grasping element 40 moves from the open to the closed position, despite the pick-up rake 10 being held at a natural raking angle that is approximately 45 degrees to the ground surface 14. Also critical to the invention, a slider element 60 is attached to the grasping element 40 with a slider rod 62 having first and second slider hinges 70 and 72. The first and second slider hinges 70 and 72 enable the proper folding of the connector element 50 to enable a user to clamp the grasping element 40 against the rake head 30.

As shown in FIG. 1, the elongate handle 20 has an upper end 22 and a lower end 24. The elongate handle 20 is preferably a wooden rod such as is typically used for rakes and similar tools. The lower end 24 of the elongate handle 20 preferably includes an externally threaded portion (not shown) for enabling removable engagement of the elongate handle 20 and the rake head 30, as described below.

Figure 5:
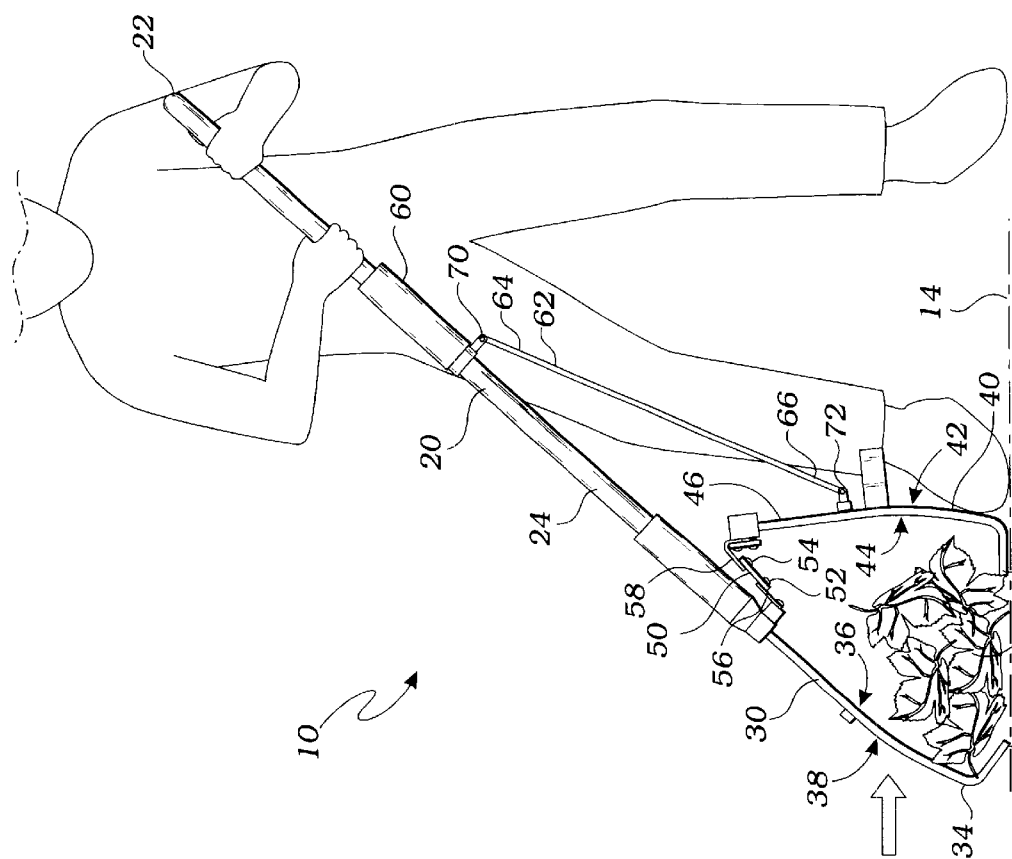
FIG. 5 is a side elevational view thereof illustrating the grasping element as it moves towards the closed position.

As shown in FIG. 1, the rake head 30 preferably includes a rake base 32 and a plurality of tines 34 extending downwardly from the rake base 32. As shown in FIG. 5, the rake base 32 has an inner rake surface 36 and an opposing outer rake surface 38. The plurality of tines 34 together terminate to form a terminal rake edge 35. The rake base 32, as used in this application, refers to the general structure above the plurality of tines 34, and can also include a portion of the plurality of tines 34. As shown in FIG. 1, the rake base 32 is shaped to enable the elongate handle 20 to be attached to the lower end 24 of the elongate handle 20. In the preferred embodiment, the rake base 32 includes an internally threaded bore (not shown) shaped to threadedly receive the externally threaded portion of the elongate handle 20, although other attachments can be devised by those skilled in the art. The rake head 30 is constructed of either metal or molded plastic using materials and techniques well known in the art.

Figures 7, 8:
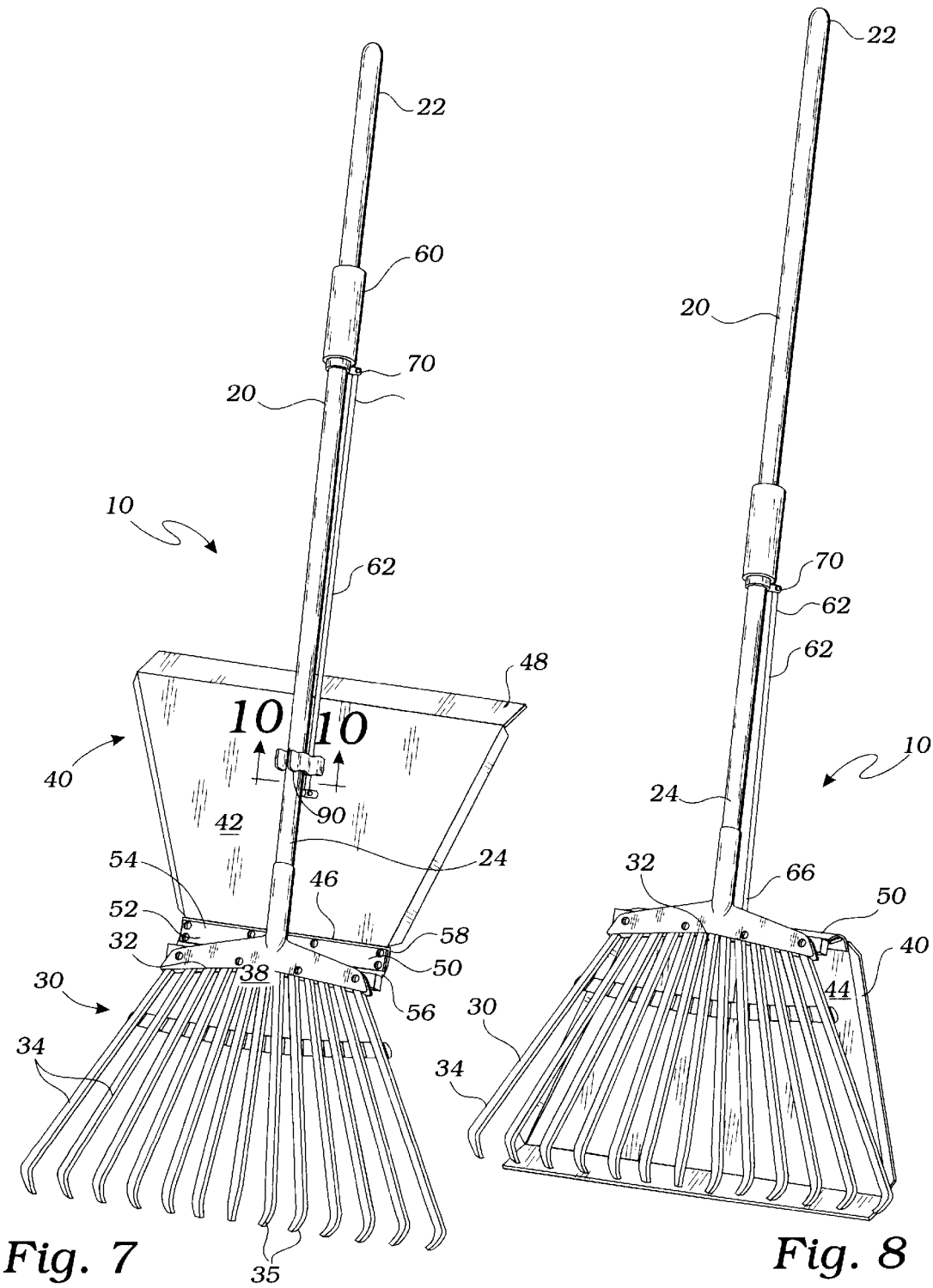
FIG. 7 is a front perspective view of a second embodiment of the present invention illustrating the grasping element in the stored position.
FIG. 8 is a front perspective view thereof illustrating the grasping element in the closed position.

In a first embodiment, as shown in FIGS. 1 and 2, the grasping element 40 is similar to the rake head 30 and includes tines and a base. In a second embodiment, as shown in FIGS. 7 and 8, the grasping element 40 is similar to a dustpan. As shown in FIG. 5, the grasping element 40 includes an outer grasping surface 42, an opposing inner grasping surface 44, an upper grasping element edge 46, and an opposing lower grasping element edge 48. The specific structure of the grasping element 40 can vary considerably as long as the basic grasping function is possible. Indeed, it is expected that various designs of the grasping element 40 will evolve as the pick-up rake 10 is adapted to different specific tasks. Various details of construction of the elongate handle 20, the rake head 30, and the grasping element 40, are disclosed in Osadsky, U.S. Pat. No. 3,733,636, Gascon, U.S. Pat. No. 4,378,671, and vom Braucke et al., U.S. Pat. No. 4,741,149, hereby incorporated in full by reference.

As shown in FIGS. 2–6, the connector element 50, critical to the function of the pick-up rake 10, is a rigid spacing element for spacing the first and second rake hinges 56 and 58. The connector element 50 has a first end 52 and a second end 54. The first rake hinge 56 hingably attaches the rake base 32 with the first end 52 of the connector element 50; and the second rake hinge 58 hingably attaches the grasping element 40, adjacent the upper grasping element edge 46, with the second end 54 of the connector element 50. The connector element 50 is preferably a rectangular element constructed of metal or plastic; however, in an alternative embodiment, not shown, the connector element 50 is provided by a pair of connector bars (not shown) similar to those shown in Gascon, U.S. Pat. No. 4,378,671, hereby incorporated by reference.

As shown in FIGS. 2–6, the first and second rake hinges 56 and 58 provide the pivotal relationship between the rake base 32, the connector element 50, and the grasping element 40. The first and second rake hinges 56 and 58 can be provided by a variety of structures, including the connector bars described above, flexible polypropylene hinges (as shown) fastened to each of the attachment points, an integral plastic hinge, or a piano hinge formed by integral plastic protrusions fastened together by steel bar (not shown). The connector element 50 is able to pivot about the first and second rake hinges 56 and 58, as described below, to enable the rake head 30 to remain in contact with the ground surface 14 while the grasping element 40 moves from the stored positioned to the closed position. In addition, the connector element 50 also enables the pick-up rake 10 to grasp larger quantities of the debris 12 by increasing the distance between the rake head 30 and the grasping element 40.

Figures 3, 4:
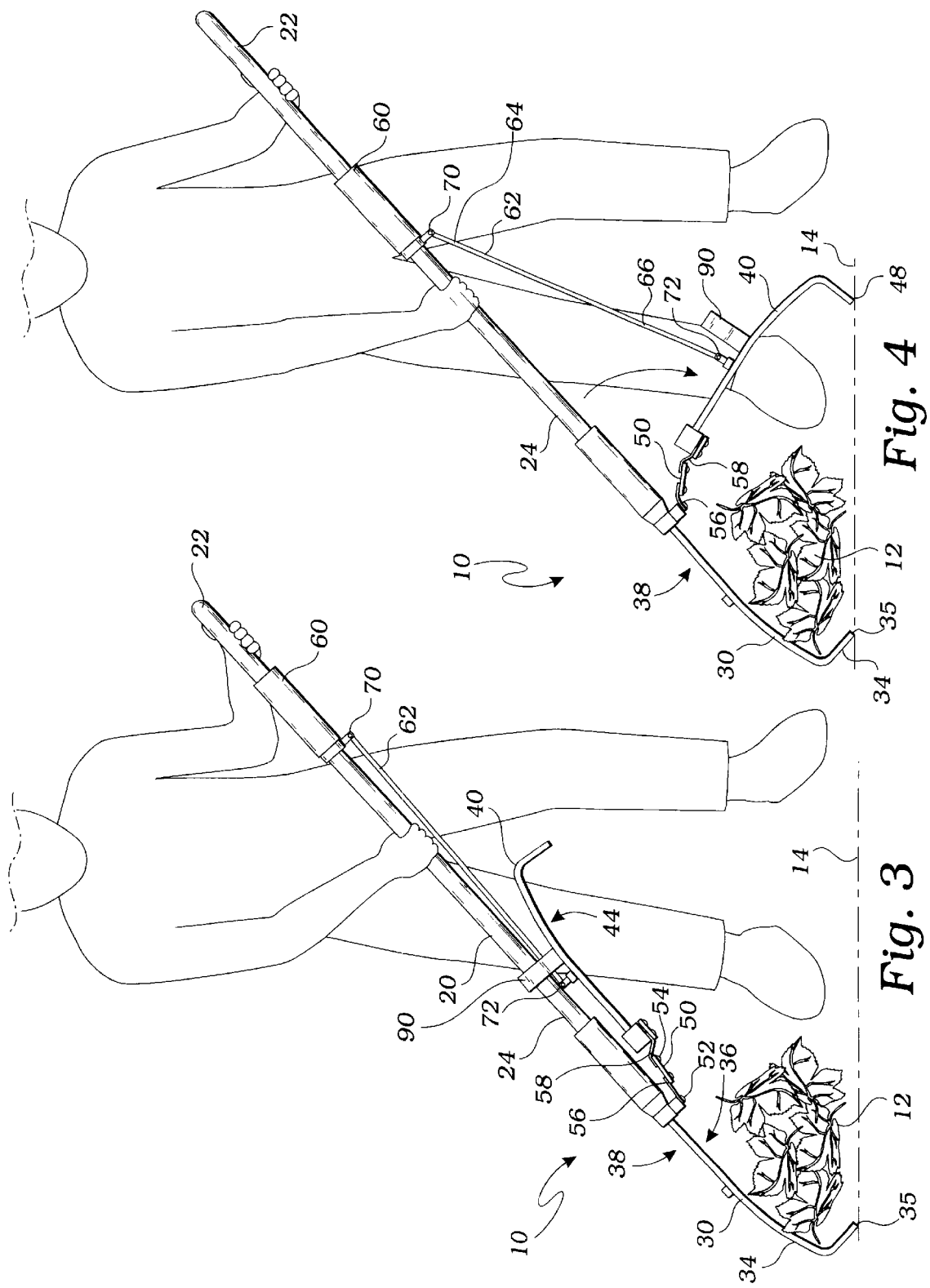
FIG. 3 is a side elevational view thereof illustrating the grasping element in the stored position and the pick-up rake being used to rake debris into a pile.
FIG. 4 is a side elevational view thereof illustrating the grasping element in an open position once the grasping element has been lowered to contact a ground surface.

As shown in FIGS. 2, 4, and 5, the pick-up rake 10 includes the slider element 60 and the slider rod 62 to enable a user to clamp the grasping element 40 against the rake head 30, thereby grasping debris 12 therebetween and facilitating removal of the debris 12. The slider element 60 is preferably a molded plastic cylinder shaped to slidably engage the elongate handle 20. The slider rod 62, which includes a proximal end 64 and a distal end 66, is a rigid rod, preferably constructed of steel or aluminum, for transmitting the movement of the slider element 60 to the grasping element 40. A first slider hinge 70 is used to hingably attach the proximal end 64 of the slider rod 62 with the slider element 60. A second slider hinge 72 is used to hingably attach the distal end 66 of the slider rod 62 with the outer grasping surface 42. The first and second slider hinges 70 and 72 are preferably formed by mating flanges pivotally interconnected by a pin, as well known in the art. It is critical that the slider rod 62 is pivotally connected to both the slider element 60 and the grasping element 40 using the first and second slider hinges 70 and 72 because this structure enables the pivoting movement of the grasping element 40 and the connector element 50, as described below.

Figure 9:
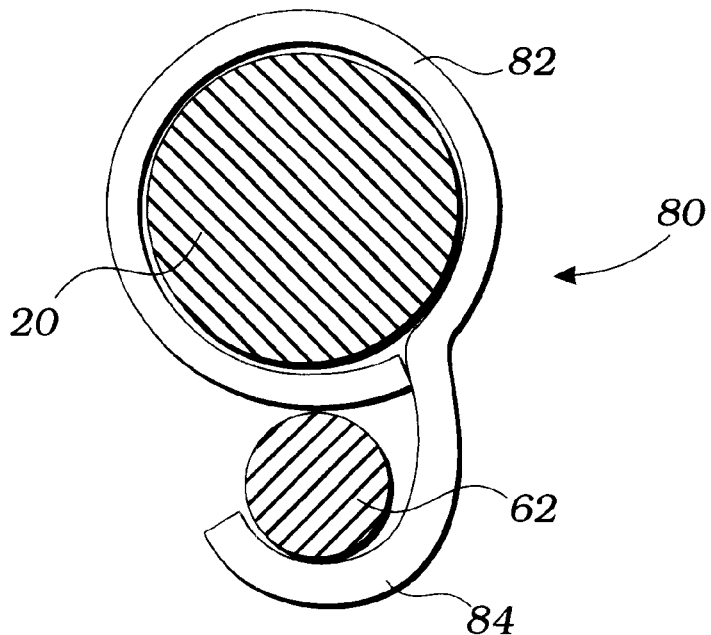
FIG. 9 is a sectional view thereof taken along line 9—9 in FIG. 1.

The pick-up rake 10 preferably further includes a means for removably locking the grasping element 40 in the stored position. In a first embodiment, as shown in FIGS. 1, 2, and 9, the means for removably locking is a rod securing element 80 having a handle locking loop 82 and a rod locking hook 84. The rod securing element 80 is preferably constructed of a single element that includes the handle locking loop 82 at one end and the rod locking hook 84 at the other end. The rod securing element 80 is preferably constructed of a resilient material, such as metal or plastic. The handle locking loop 82 is preferably shaped to fit firmly around most, if not all, of the elongate handle 20 for securely attaching the rod securing element 80 to the pick-up rake 10. The rod locking hook 84 is preferably shaped to removably hook the slider rod 62. When the grasping element 40 is in the stored position, as shown in FIG. 1, the slider rod 62 is hooked by the rod locking hook 84, thereby fastening the slider rod 62 adjacent the elongate handle 20, as shown in FIG. 9, and holding the grasping element 40 in the stored position. When the slider rod 62 is removed from the rod locking hook 84, the grasping element 40 is free to move from the stored position to the closed position.

Figure 10:
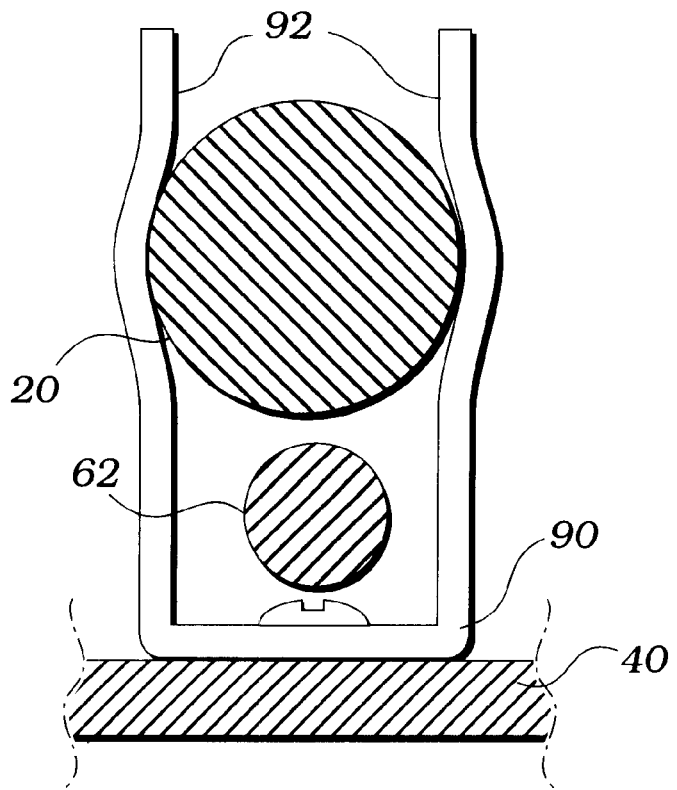
FIG. 10 is a sectional view thereof taken along line 10—10 in FIG. 7.

In a second embodiment, as shown in FIGS. 7 and 10, the means for removably locking is a handle locking clamp 90 having a pair of resilient locking arms 92. The handle locking clamp 90 is preferably a generally U-shaped element constructed of resilient steel, the handle locking clamp 90 being attached to the grasping element 40 with a screw or similar fastener.

The pair of resilient locking arms 92 are shaped to fit around the slider rod 62 and clamp the elongate handle 20, thereby locking the grasping element 40 in the stored position.

The pick-up rake 10 enables a novel method for collecting the debris 12 from the ground surface 14. The pick-up rake 10, described above, is provided for both gathering the debris 12 and collecting the debris 12 into a waste disposal container. The slider element 60 is slid along the elongate handle 20 towards the upper end 22, thereby moving the grasping element 40 to a stored position, shown in FIG. 3, in which the outer grasping surface 42 is adjacent to the elongate handle 20. The grasping element 40 is then secured in the stored position. In the first embodiment, as shown in FIGS. 1 and 9, the slider rod 62 is secured to the elongate handle 20 with the rod securing element 80, thereby fastening the grasping element 40 in the stored position. In a second embodiment, as shown in FIGS. 7 and 10, the grasping element 40 is secured directly to the elongate handle 20 using the handle locking clamp 90.

As shown in FIG. 3, in the stored position the pick-up rake 10 is useful for raking the debris 12 in the same manner as a conventional rake, by raking the terminal rake edge 35 of the plurality of tines 34 of the rake head 30 across the ground surface 14 to collect the debris 12 into a pile.

As shown in FIG. 4, the grasping element 40 is then lowered to the open position in which the grasping element 40 rests upon the ground surface 14. In moving from the stored position to the open position, the grasping element 40 rotates about the first and second rake hinges 56 and 58 until the lower grasping element edge 48 contacts the ground surface 14. In this position, the pick-up rake 10 is configured to grasp the debris 14.

Figure 6:
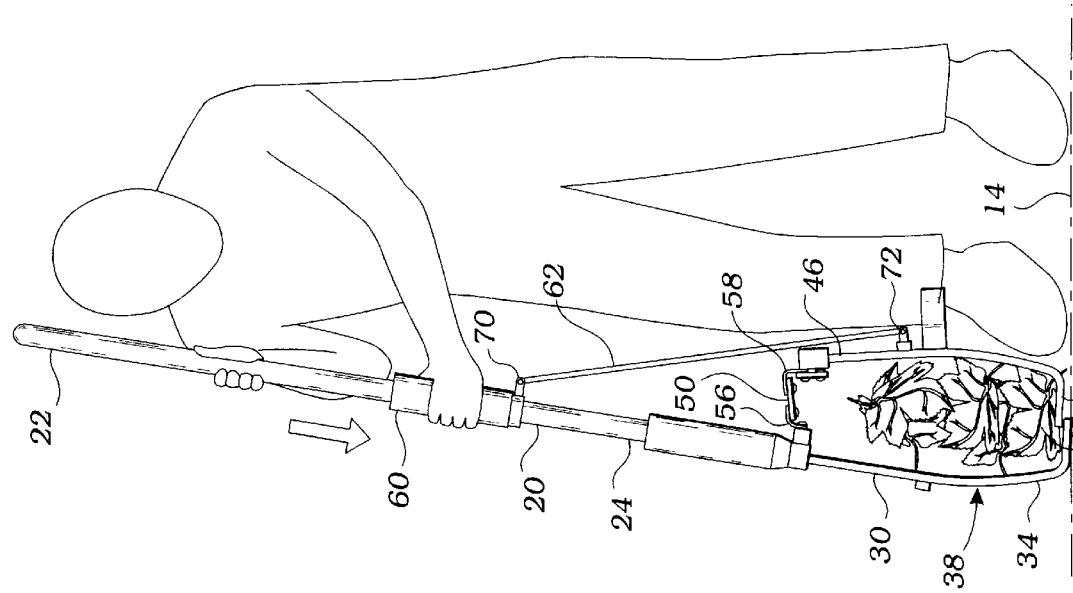
FIG. 6 is a side elevational view thereof illustrating the grasping element in a closed position.

As shown in FIGS. 5–6, the rake head 30 is then pulled, via the elongate handle 20, towards the grasping element 40 until the lower grasping element edge 48 is in a closed position adjacent the terminal rake edge 35. In the preferred motion, the user can place a foot against the grasping element 40 to ensure its proper folding about the connector element 50. It is critical that the grasping element 40 and the connector element 50 pivot about the first and second rake hinges 56 and 58 to enable the plurality of tines 34 of the rake head 30 to remain in contact with the ground surface 14 even while the grasping element 40 rotates through this motion and the pick-up rake 10 is held at a natural raking angle. The natural raking angle is approximately 45 degrees to the ground surface 14, although this will obviously vary from user to user depending upon the height of the user and the particular style of raking used by the user The angle of the pick-up rake 10 also varies changes through the process of raking, with the angle being closer to 30–40 degrees when the user reaches for distant leaves, and the angle rising to 50–60 degrees or more as the user pulls the pick-up rake 10 closer to his or her feet.

It is critical that the connector element 50 pivots, as shown in FIG. 5, from a position generally perpendicular to the ground surface 14, to a position that is generally parallel with the elongate handle 20, thereby accommodating the grasping element 40, despite the fact that the pick-up rake 10 is being held at a natural raking angle. If it were not for the pivoting movement of the connector element 50, the grasping element 40 would lift the rake head 30 off the ground surface 14. The unique pivoting movement is enabled by the novel combination of the first and second rake hinges 56 and 58, the connector element 50, and the first and second slider hinges 70 and 72. Prior art rakes, which do not contain this unique combination of hinges, will not allow such a movement. Prior art rakes must be held upright, generally perpendicular to the ground, to gather debris, and do not allow the natural raking movement for gathering debris.

As shown in FIG. 6, once the grasping element 40 has been closed against the rake head 30, the elongate handle 20 is held in a position perpendicular to the ground surface 14 and the slider element 60 is pushed towards the lower end 24 of the elongate handle 20 such that the slider rod 62 pushes the grasping element 40 against the rake head 30 to clamp the debris 12 between the grasping element 40 and the rake head 30. In this position, the pick-up rake 10 can be used to lift the debris 12, thereby allowing the debris 12 to be removed and placed in a waste disposal container or other means for disposal. If the pick-up rake 10 is being used to lift a particularly heavy load of debris 14, the user can also grasp the elongate handle 20 below the slider element 60, along with the slider rod 62, and simultaneously lift upwardly on the elongate handle 20 and use the slider rod 62 to clamp the grasping element 40 against the rake head 30.

The first and second rake hinge elements 56 and 58 of the pick-up rake 10 can be constructed to have only limited ranges of motion to ensure the proper folding of the grasping element 40.

If the user presses downwardly on the slider element 60 before moving the grasping element 40 to the closed position, the slider element 60 can have the effect of "collapsing" the connector element 50 so that it cannot fold properly. As shown in FIG. 2, an upwardly extending flange 94 positioned to extend upwardly from the grasping element 40 functions to prevent the collapse of the connector element 50 and ensure the proper folding of the connector element 50. The connector element 50 preferably includes a plate 96 that is sized and shaped to contact the upwardly extending flange 94 to limit the movement of the connector element 50 to the proper range. Obviously, those skilled in the art can devise many mechanisms for limiting the range of the first and second rake hinge elements 56 and 58, including shaping the hinges themselves so they are internally limited in their range of movement.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A pick-up rake comprising:
   an elongate handle having an upper end and a lower end;
   a rake head having a rake base and a plurality of tines extending from the rake base, the lower end of the elongate handle being attached to the rake base;
   a connector element having a first end and a second end;
   a first rake hinge that hingably attaches the rake base with the first end of the connector element;

a grasping element having an outer grasping surface and an upper grasping element edge;

a second rake hinge that hingably attaches the grasping element, adjacent the upper grasping element edge, with the second end of the connector element;

a slider element slidably engaged to the elongate handle;

a slider rod having a proximal end and a distal end;

a first slider hinge that hingably attaches the proximal end of the slider rod with the slider element; and a second slider hinge that hingably attaches the distal end of the slider rod with the outer grasping surface.

2. The device of claim 1 further comprising a means for removably locking the grasping element in a stored position.

3. A method for collecting debris from a ground surface, the method comprising the steps of:

a) providing a pick-up rake comprising:

an elongate handle having an upper end and a lower end;

a rake head having a rake base and a plurality of tines extending from the rake base, the rake base having an inner rake surface and an opposing outer rake surface, the lower end of the elongate handle being attached to the rake base, the plurality of tines together terminating to form a terminal rake edge;

a connector element having a first end and a second end;

a first rake hinge that hingably attaches the inner rake surface of the rake base with the first end of the connector element;

a grasping element having an outer grasping surface, an opposing inner grasping surface, an upper grasping element edge, and an opposing lower grasping element edge;

a second rake hinge that hingably attaches the grasping element, adjacent the upper grasping element edge, with the second end of the connector element;

a slider element slidably engaged to the elongate handle;

a slider rod having a proximal end and a distal end;

a first slider hinge that hingably attaches the proximal end of the slider rod with the slider element; and a second slider hinge that hingably attaches the distal end of the slider rod with the outer grasping surface;

b) sliding the slider element along the elongate handle towards the upper end, thereby moving the grasping element to a stored position in which the outer grasping surface is adjacent to the elongate handle;

c) securing the grasping element in the stored position adjacent to the elongate handle;

d) raking the terminal rake edge of the plurality of tines of the rake head across the ground surface to collect the debris into a pile;

e) releasing the grasping element and allowing the grasping element to be lowered to the ground, the grasping element rotating about the first and second rake hinges until the lower grasping element edge contacts the ground;

f) pulling rake head, via the elongate handle, towards the grasping element until the lower grasping element edge is adjacent the terminal rake edge, the grasping element and the connector element pivoting about the first and second rake hinges to enable the plurality of tines to remain in contact with the ground surface; and g) pushing the slider element towards the lower end of the elongate handle such that the slider rod pushes the grasping element against the rake head to clamp the debris between the grasping element and the rake head, thereby allowing the debris to be removed.

* * * * *